G. B. LEA QUEE.
APPARATUS FOR LOCATING SUNKEN VESSELS.
APPLICATION FILED MAY 17, 1909.
957,222.
Patented May 10, 1910.
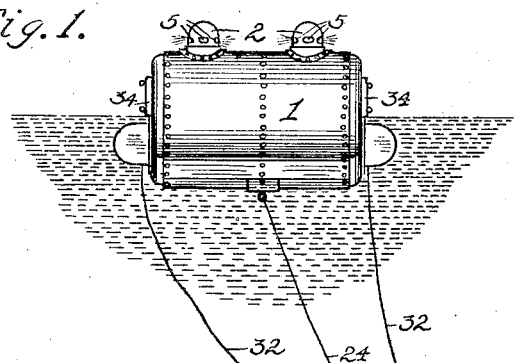
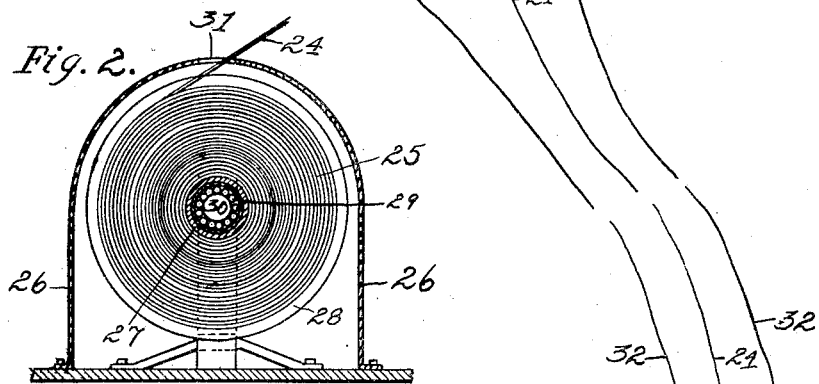
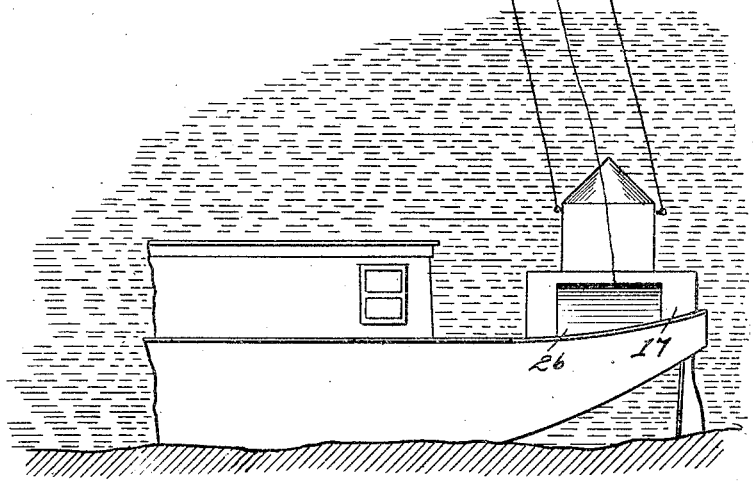
Witnesses:
C. E. Wessels,
B. G. Richards
Inventor:
George B. Lea Quee.
By Joshua R. H. Potts
his Attorney.

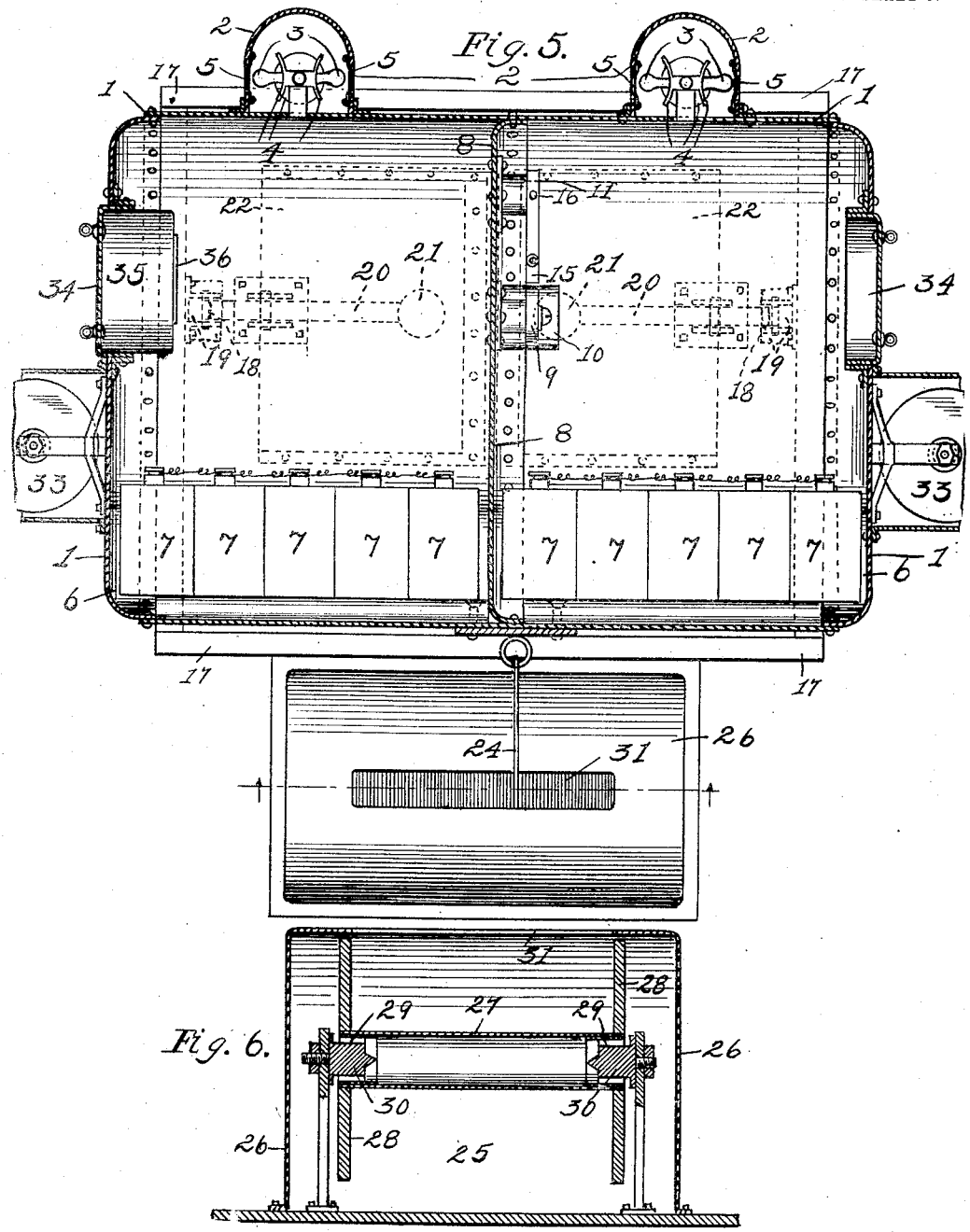

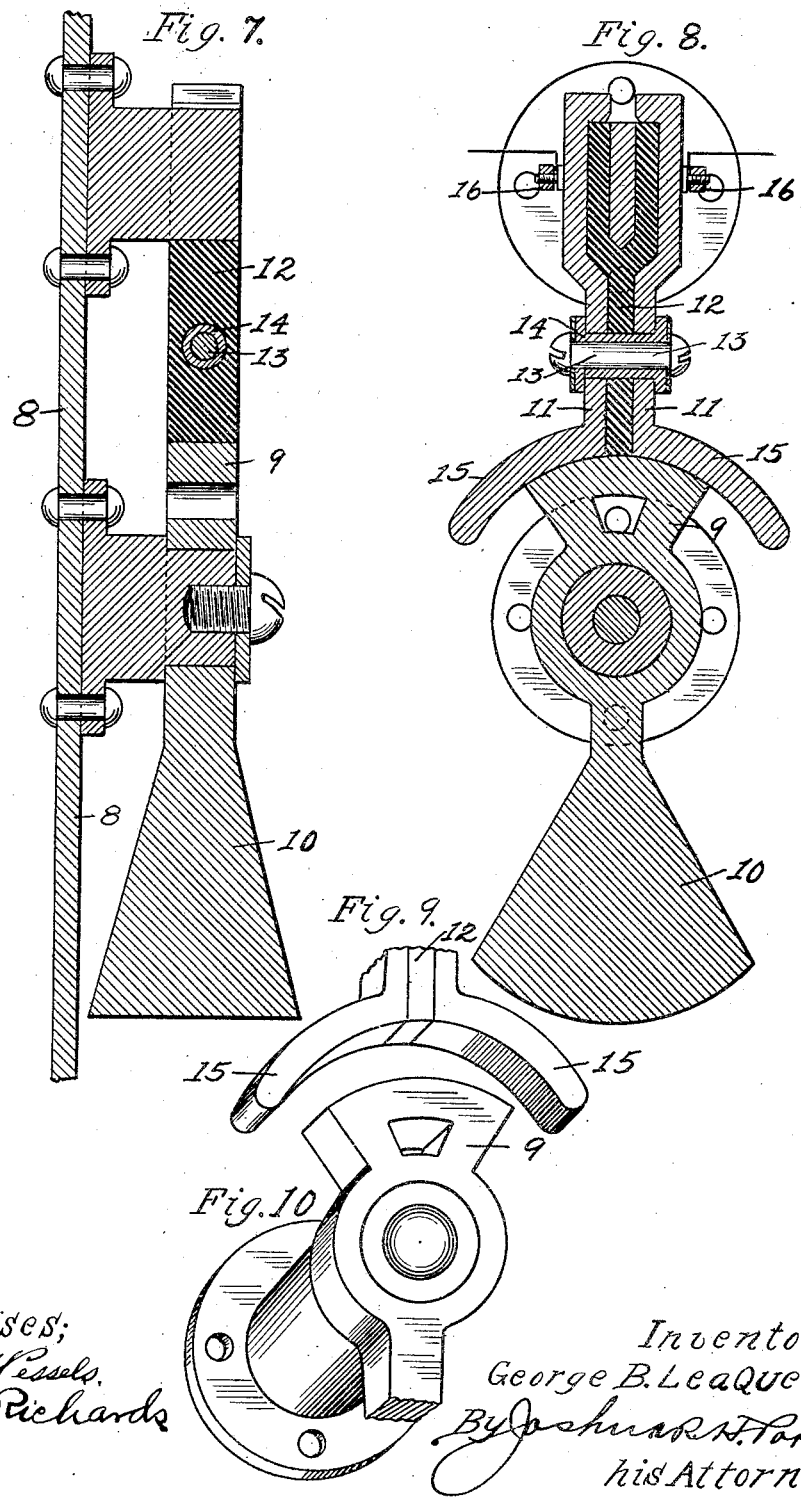

UNITED STATES PATENT OFFICE

GEORGE B. LEA QUEE, OF MOUNT IRON, MINNESOTA.

APPARATUS FOR LOCATING SUNKEN VESSELS.

957,222.  Specification of Letters Patent.  Patented May 10, 1910.

Application filed May 17, 1909. Serial No. 496,611.

*To all whom it may concern:*

Be it known that I, GEORGE B. LEA QUEE, a citizen of the United States, residing at Mount Iron, county of St. Louis, and State of Minnesota, have invented certain new and useful Improvements in Apparatus for Locating Sunken Vessels, of which the following is a specification.

My invention relates to apparatus for locating sunken vessels and its object is to provide improved apparatus for this purpose in which improved mechanism is provided for maintaining a light on a locating buoy; improved and automatic mechanism is provided for carrying and releasing the locating buoy and an improved form of buoy is provided.

The invention consists in the combination and arrangement of parts hereinafter described and claimed.

Figure 3:
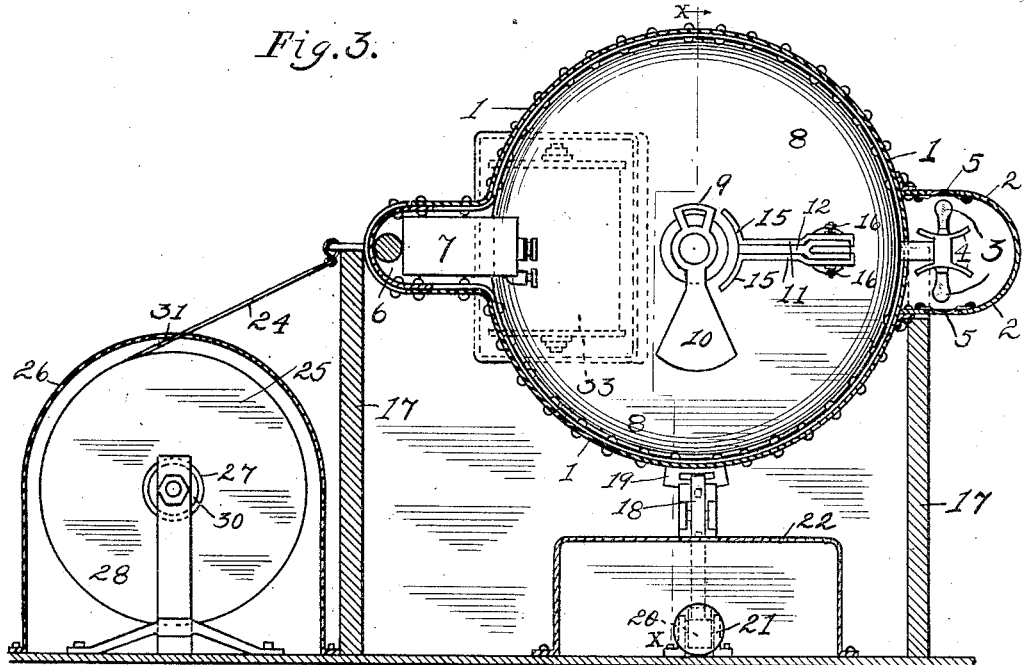
Figure 4:
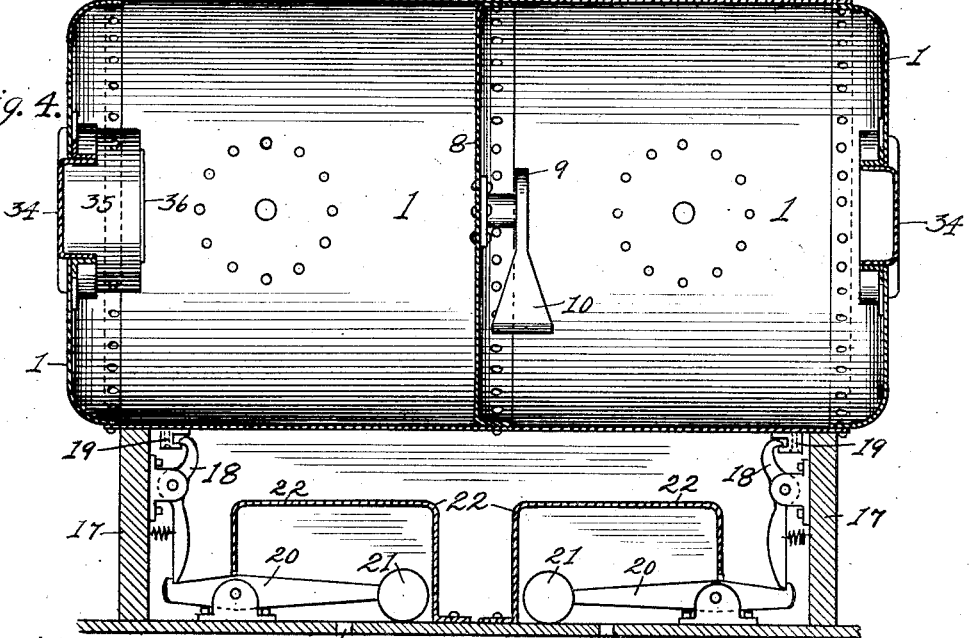

In the drawings, Figure 1 is a diagrammatic view illustrating apparatus embodying my invention as in actual use, Fig. 2 is an enlarged section through the reel which carries the main locating wire or cable, Fig. 3 is an enlarged vertical section showing the apparatus in its normal position on a vessel, Fig. 4 is a section on line x x of Fig. 3, Fig. 5 is a vertical section through the buoy, Fig. 6 is a longitudinal section through the reel shown in Fig. 2, Fig 7 is an enlarged section of the circuit breaker employed for operating the lights in the buoy, Fig. 8 is a section at right angles to Fig. 7, Fig. 9 is a partial perspective view of one member of the circuit breaker, and Fig. 10 is a partial perspective view of the other member of the circuit breaker.

In the preferred form of construction a buoy 1 made of copper, iron, aluminium or other metal is provided with two domes 2 containing electric lights 3 and reflecting mirrors 4. In the sides of the domes opposite the lights and mirrors are placed glass prismal lenses 5 so shaped that in conjunction with the mirrors 4 parallel rays of light are transmitted. The domes 2 are fitted to the upper side of the buoy 1 by water-tight connections, thus constituting separate chambers from the buoy itself and preventing filling of the buoy should a lens of one of the domes be broken.

At the bottom of the buoy is a well or chamber 6 containing electric batteries 7 designed for supplying the electric lights 3 with the necessary current. The buoy is divided into two separate compartments by a partition or bulk head 8 and on this bulk head is pivoted a rocking contact 9 carrying a weight 10. Above the contact 9 is mounted a divided contact consisting of two parts 11, insulated from each other by the insulating material 12 and held together by the screw or bolt 13 fitting in an insulating tube 14. Contacts 11 carry arms 15 shaped to contact with rocker 9 as it rotates.

The batteries 7 are connected through binding posts 16 with the lights 3 so that when the rocker 9 is in the position shown in Fig. 8 the circuit through the batteries and lights will be closed and the lights lighted, but when the rocker 9 moves so that it does not contact with both the arms 15 the circuit is broken and the lights extinguished as will be readily understood by those skilled in the art.

In its normal position on a vessel the buoy 1 is placed upon a suitable frame or support 17 in the position shown in Fig. 3 so that the rocker 9 is swung by the weight 10 to the position indicated and the electric circuit through lamps 3 is broken. The buoy is so shaped and weighted that it floats in the position indicated in Fig. 1. In this position it will be seen that the rocker 9 will rotate to close the circuit through arms 15 and thus excite the lights 3 so that if the buoy is released from the vessel when it sinks, it will float in such a position as to close the circuit through the lights and keep them excited or lighted. As the buoy rocks upon the waves the rocker 9 will remain practically stationary under the influence of weight 10 so that if the rocking of the waves is violent enough or if the rocker 9 is made narrow enough the rocking motion of the waves will cause the lights 3 to be alternately lighted and extinguished.

The buoy 1 is held in position in support 17 by means of spring held catches 18 engaging lugs 19 on the bottom thereof. Catches 18 are held in locking engagement with lugs 19 by means of catches 20 which are provided with floats 21 inclosed in boxes or cases 22. By this arrangement it will be seen that as soon as the floats 21 are immersed in water the levers 20 will be operated to release catches 18 and their springs will withdraw the catches from the lugs 19 permitting the float to escape and rise to the top of the water. A drainage hole 23 is provided for boxes 22 to drain off any water accidentally entering them.

The buoy 1 is secured to a wire or cable 24 wound onto a reel 25 contained in a casing 26 secured to the vessel adjacent to the support for the buoy. The reel is preferably made of a tube 27 carrying flanges 28 and mounted upon roller bearings 29 on the standards 30. A suitable slot 31 is provided in the side of casing 26 to permit unwinding of the wire or cable. Sufficient length of wire or cable should be provided to permit the float to rise to the top of the water where a vessel should happen to sink. To further locate the vessel from the buoy, when found, I provide two supplemental wires or cables 32 carried by reels 33 on the ends of the buoy 1. These wires may be of a smaller size than the main wire 24 and can be secured to any convenient part of the vessel or could be provided with anchors.

The buoy is provided with suitable manholes 34 for entry to the interior of the buoy compartments for the purpose of inspection or repair and a sealed box 35 having a door 36 opening into the buoy is provided for the reception of the name of the vessel carrying the buoy, passenger lists, freight lists, or any other data which is important for the finders of the buoy to know in regard to the sunken vessel.

While I have illustrated and described the preferred construction for carrying my invention into effect, this is capable of modification without departing from the spirit of the invention. I, therefore, do not wish to be limited to the exact construction set forth, but

What I claim as new and desire to secure by Letters Patent is:

1. An apparatus for the location of sunken vessels, comprising a hollow buoy; an electric light carried by the buoy; batteries carried by the buoy; electrical contacts in the buoy, comprising two adjacent members insulated from each other and having contiguous cylindrical contact surfaces; an electric circuit including said batteries, light and contacts; and a weighted rocker carrying a conducting member having a cylindrical surface adapted to contact with said contact surfaces when the buoy is afloat, substantially as described.

2. An apparatus for the location of sunken vessels, comprising a hollow buoy; an electric light carried by the buoy; batteries carried by the buoy; electrical contacts in the buoy, comprising two adjacent members insulated from each other and having contiguous cylindrical contact surfaces; an electric circuit including said batteries, light and contacts; and a weighted rocker carrying a conducting member having a cylindrical surface adapted to contact with said contact surfaces when the buoy is afloat; and of a length less than the ordinary rock of the buoy on the waves, substantially as described.

3. An apparatus for the location of sunken vessels, comprising the buoy 1 made in two air-tight compartments; electric lights 3 located in separate water-tight compartments, a weighted rocker 9 and divided contacts 11 for opening and closing the lighting circuit and a flexible connection between the buoy and vessel, substantially as described.

4. An apparatus for the location of sunken vessels, comprising the buoy 1 made in two air-tight compartments; electric lights located in separate water-tight compartments, a weighted rocker 9 and divided contacts 11 for opening and closing the lighting circuit, a suitable support for the buoy on the vessel, spring held catches 18 for securing the buoy to the support, float operated mechanism for releasing catches 18 and a flexible connection between the buoy and vessel, substantially as described.

5. An apparatus for the location of sunken vessels, comprising the buoy 1 made in two air-tight compartments, electric lights 3 located in separate water-tight compartments; a weighted rocker 9 and divided contacts 11 for opening and closing the lighting circuit, a suitable support for the buoy on the vessel, spring held catches 18 for securing the buoy to the support, float operated mechanism for releasing the catches 18, a wire 24 attached to the buoy, and a reel 25 for holding wire 24, substantially as described.

6. An apparatus for the location of sunken vessels, comprising the buoy 1 made in two air-tight compartments; electric lights 3 located in separate water-tight compartments, a weighted rocker 9 and divided contacts 11 for opening and closing the lighting circuit; a suitable support for the buoy on the vessel; spring held catches 18 for securing the buoy to the support; float operated mechanism for releasing the catches 18, a wire 24 attached to the buoy, a reel 25 for holding wire 24, and reels 33 and wires 32 carried by the buoy and provided with means for locating the vessel, substantially as described.

In testimony whereof I have signed my name to this specification in the presence of two subscribing witnesses.

GEO. B. LEA QUEE.

Witnesses:
T. J. WATKINS,
FRANK GAYMON.